3,019,691
OPTICAL VIEWER PARTICULARLY FOR MICRO-
FILM AND TRANSPARENCIES
Harvey B. Schneider, 162—40 9th Ave.,
Beechhurst, N.Y.
Filed Nov. 12, 1959, Ser. No. 852,523
8 Claims. (Cl. 88—1)

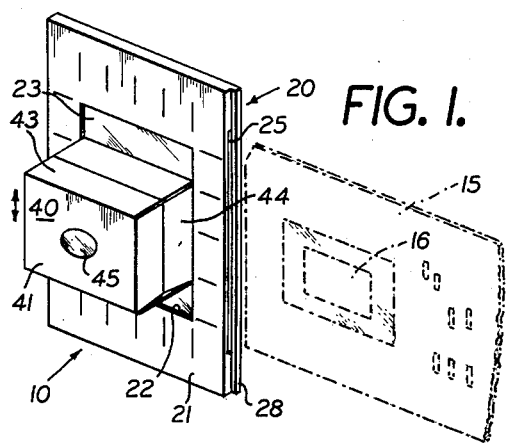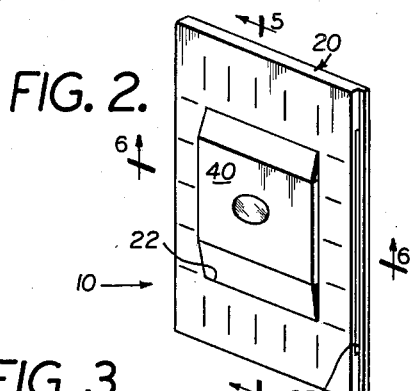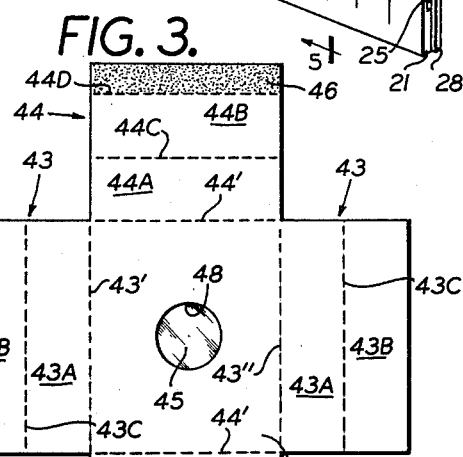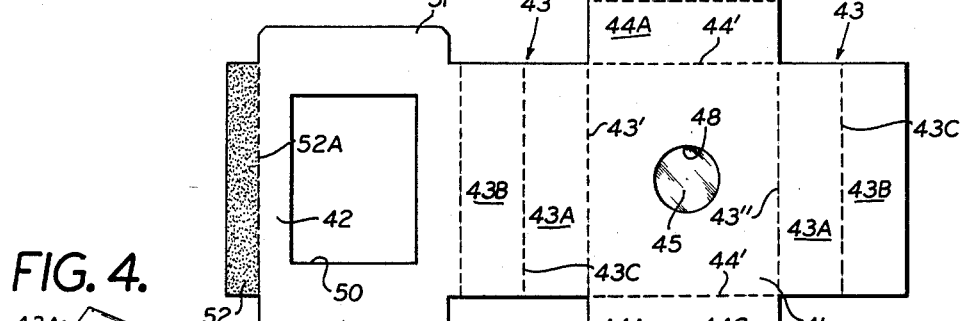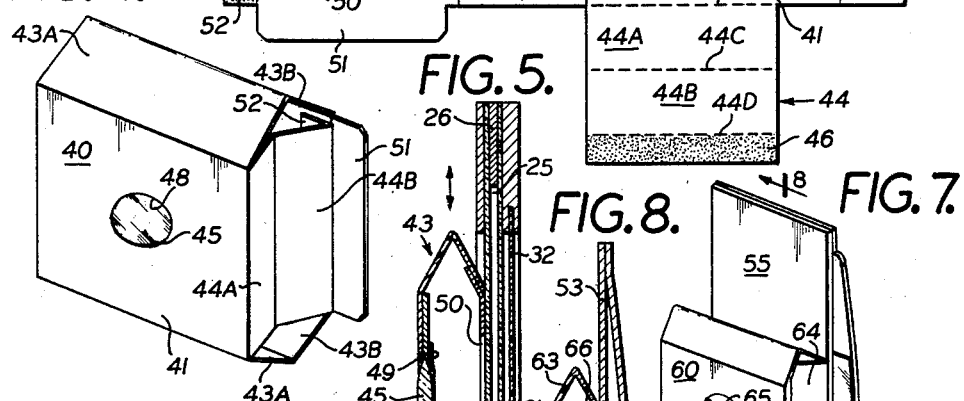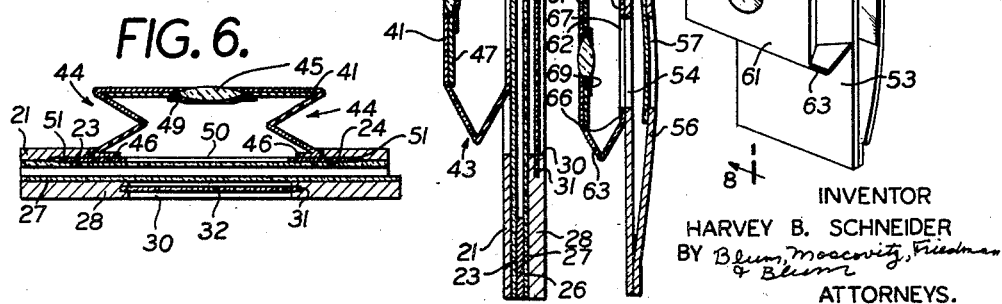
INVENTOR
HARVEY B. SCHNEIDER
ATTORNEYS.

This invention relates to an optical viewer particularly for microfilm, and more particularly to a simple, inexpensive, portable and collapsible microfilm viewer of novel construction. While particularly adapted for the viewing of microfilm, the optical viewer of the present invention is not limited thereto, but may be used also for viewing of films, slides, and other forms of transparencies.

Due to the very substantial reductions in size effected by microfilming of records, archives, engineering drawings, etc., a correspondingly very substantial degree of magnification of the microfilmed subject is required to restore the viewed area to a size sufficient for ready examination and reading. For this reason, known microfilm viewers have generally been of bulky and heavy construction, not readily adapted for portability. For example, many microfilm viewers are of the projector type in which a greatly enlarged image of the microfilm is projected onto a screen.

It has been suggested that optical viewers for transparencies, slides, and the like be provided in a collapsible form so that they may be readily carried in the pocket of a suit, for example. However, optical viewers of this type are completely unsuitable for reading microfilm. Due to the high degree of magnification required for examination of details of microfilm, and the resulting small field of view, known optical viewers cannot be effectively used. For example, the required high degree of magnification necessitates examination of a small field of view of the microfilm. Thus, the microfilm must be scanned area by area and known collapsible viewers have not been adapted for such scanning.

In accordance with the present invention, an optical viewer for microfilm is provided in which microfilm may be readily scanned whether mounted in apertured cards, on a sheet, or in a roll. In one form of the invention, a guide for the microfilm or its mounting is provided and in which the microfilm remains relatively fixed against movement in one direction during scaninng, while a high powered lens is provided in a lens housing which is movable in such one direction so that successive areas along such one direction may be scanned with the high powered lens. The microfilm may then be shifted in a direction at right angles to the direction of movement of the lens, by a small amount, and the next relatively narrow strip extending in the direction of movement of the lens can be similarly scanned.

In another embodiment of the invention, the lens and its housing are relatively fixed but the slot on the slide of guiding means for the microfilm is made sufficiently wide that the microfilm may be shifted laterally a substantial amount, so that successive areas along a strip extending laterally of the microfilm may be scanned by the high powered lens. The microfilm may then be moved longitudinally and a second laterally extending strip examined in a similar manner by again shifting the microfilm laterally relative to the optical axis of the lens housing.

In both embodiments, the lens housing is formed from a pre-cut and folded blank of flexible opaque material, such as paperboard, cardboard, plastics, metal, or wood, and is arranged to be normally folded substantially flush with the outer or front face of the slide holder. The latter may be constituted by superposed sheets of opaque material formed with aligned, preferably congruent, windows arranged for alignment with a lens in the lens housing or holder and with a window opening in the latter. The window in the rearmost sheet of the slide holder is covered with a sheet of translucent, light diffusing material, and one or more of the other windows in the film holder may be covered with a sheet of transparent material. Alternatively, the slide holder may be suitably formed and cut as a one-piece element except for the transparent window sheets.

For an understanding of the invention principles, reference is made to the following description of typical embodiments thereof as illustrated in the accompanying drawings. In the drawings:

FIG. 1 is a perspective view of one form of microfilm viewer embodying the invention, in the erected condition;

FIG. 2 is a perspective view of this form of the viewer of the normally collapsed condition;

FIG. 3 is a plan view of the blank from which the lens housing is formed;

FIG. 4 is a perspective view of the movable lens housing per se;

FIG. 5 is a sectional view on the line 5—5 of FIG. 2;

FIG. 6 is a sectional view on the line 6—6 of FIG. 2;

FIG. 7 is a perspective view of another form of microfilm viewer embodying the invention and including a lens housing which is immovable relative to the slide holder; and FIG. 8 is a sectional view taken on the line 8—8 of FIG. 7.

In the embodiment of the invention shown in FIGS. 1 through 6, the microfilm viewer 10 shown therein comprises a film holder 20 and a collapsible lens housing 40 mounted for limited sliding movement laterally of film in the film holder. As best seen in FIGS. 1, 2, 5, and 6, the film holder comprises an outer sheet or lamina 21, of flexible opaque material, having a large window opening 22 therein and having a sheet of transparent material 23 cemented or otherwise secured to its inner surface. As best seen in FIG. 6, sheet 23 is secured to the rear face of lamina 21 only adjacent the edges of the lamina. Alternatively, the edges of the lamina secured to sheet 23 may be made thicker than the remaining portion of the lamina, all for a purpose to be described. There are thus provided, between lamina 21 and sheet 23, unadhered portions along the longer sides of window 22 which form guide ways 24 for a purpose to be described.

A pair of relatively narrow and relatively thick rectangular strips 26, or flexible opaque material, are secured along the upper and lower rear edges of sheet 23, and a second transparent sheet 27 is secured to the rear surfaces of strips 26. The strips 26 act as separators between the transparent sheets 23 and 27 providing a slide way 25 for the insertion of an apertured card 15, on which is mounted a microfilm 16, into the holder 20, as shown in FIG. 1. The microfilm 16 on card 15 can thus be positioned between the transparent sheets 23 and 27. While the microfilm 16 is illustrated as mounted across an aperture in a card 15, which latter may be of the type used in accounting machines, the microfilm may be in the form of a roll, and in each of these cases the film itself may be mounted directly in the slideway or guide 25.

A relatively thick rear sheet or lamina 28, of flexible opaque material, is secured to the rear surface of sheet 27, as by cementing or the like, and has a rectangular window opening 30 which is substantially congruent with and aligned with the opening 22 in front lamina 21. The edge of the opening 30 is formed all around its periphery with a slot 31 in which is seated the peripheral edges of a window 32, of translucent, light diffusing material.

The front and rear lamina, and the separator strips 26, may be made of cardboard or paperboard, for example, and the several transparent sheets 23, 27, and 32 may be, for example, a suitable plastic composition material.

Referring to FIGS. 3 through 6, the lens mount, holder, or housing 40 is formed from a sheet of paperboard or the like which is either black in color or covered with layers of black cloth on both suraces. This sheet or blank is suitably die cut and stamped to provide fold lines and cut edges dividing the blank into a front wall 41, a rear wall 42, upper and lower walls 43, and side walls 44. One wall 43 is joined by fold lines 43′ to both the front and rear walls 41 and 42, and the other wall 43 is joined by a fold line 43″ to front wall 41. Walls 44 are joined by fold lines 44′ to front wall 41.

Each wall 43 is divided into two equal sections 43A and 43B by a fold line 43C, and each wall 44 is divided into equal sections 44A and 44B by a fold line 44C. In addition, each wall 44 has an end flap 46 joined thereto along a fold line 44D, and these end flaps 46 have glue or other type of cement along one surface thereof.

Front wall 41 is reinforced by an underlying member 47 of stiff material, such as stiff paperboard, and wall 41 and member 47 are centrally apertured, as at 48, to receive a relatively high powered magnifying lens 45 which is held in position by a piece of adhesive 49 having a central opening therein somewhat smaller in diameter than the diameter of lens 45.

Rear wall 42 is formed with a rectangular central opening 50, and has coplanar side flaps 51, 51, as well as an end flap 52 joined to wall 42 along a fold line 52A. Flap 52 is coated with cement, glue, or other adhesive.

To form the lens housing 40, end flap 52 is bent about fold lines 52A, side walls 43 are bent about fold lines 43′, and flap 52 is cemented to the back surface of section 43B of the top wall 43 projecting from the right of front wall 41 as viewed in FIG. 2. The side walls 44 are creased about fold lines 44C and are bent about fold lines 44′, with their flaps 46 bent about fold lines 44D and adhered to the back surface of rear wall 42 along the imaginary line joining flaps 51 to the main body of wall 42, as best illustrated in FIG. 4.

The flaps 51 act as guides for moving the lens housing 40 vertically of the film holder 20. These flaps extend into the slideways 24 previously mentioned so that the lens housing may be moved between two upper and lower limiting positions.

In the operation of this embodiment of the microfilm viewer, the lens housing is erected as shown in FIG. 1 thus spacing lens 45 at an effective magnifying distance from the film holder. The card 15, in the illustrative example, is then slid into the guideway 25 until microfilm 16 thereon is aligned with window 50. The viewer 10 is then pointed toward a source of light from which light-rays enter through the diffusing window 32 and pass through the film 16 and window 23 before reaching lens 15. The lens magnifies the particular small area of the microfilm then centered about the optical axis of the lens. By moving the lens holder longitudinally of the film holder, a narrow strip extending laterally of the microfilm may be scanned. The card 15 may then be repositioned longitudinally of the guideway 25 and adjacent areas of the microfilm 16 can be scanned in a similar manner by moving the lens housing longitudinally of the film holder.

When the microfilm has been viewed, card 15 is removed from the film holder 20 and outer or front wall 41 of lens housing 40 is pressed toward the film holder. This causes the upper and lower walls 43 to bend outwardly, and the side walls 44 to bend inwardly. The relation of the size of the opening 22 to the lens housing is such that, in the collapsed condition of the lens housing, as shown in FIG. 2, the top and bottom walls 43, with their sections folded upon each other, fit within the window 52 so that a substantially flush unit is provided for carrying and transport. To erect the unit, it is simply necessary to pull outwardly on wall 41.

FIGS. 7 and 8 illustrate a modified form of the viewer in which the lens housing is immovable relative to the film holder but in which the film guideway is sufficiently wide to permit lateral shifting of a film relative to the lens housing, for scanning purposes. Referring to these figures, the microfilm viewer shown therein comprises a film holder 55 and a lens housing 60. Film holder 55 comprises a pair of relatively elongated rectangular sheets or laminae of opaque paperboard or cardboard, or the like. The front lamina 53 is formed wtih a rectangular window opening 54, and the rear lamina 56 is formed with a correspondingly sized, shaped, and located rectangular opening 57. The two laminae are secured to each other at their ends, leaving a relatively wide film receiving guideway, substantially wider than the microfilm to be viewed, between the glued together ends.

The lens housing is closely similar in construction to that of the arrangement shown in FIGS. 1 through 6. Thus, the lens housing includes a front wall 61, top and bottom walls 63 folded about medial fold lines, and side walls 64 also foldable inwardly about medial fold lines. However, in this particular case, the ends of top and bottom walls 63 are formed with gluing flaps 66, and the ends of side walls 64 are formed with gluing flaps 67. These flaps are glued to the front surface of lamina 53 so that their free edges form a frame around the opening 54 therein.

A centrally located relatively high powered magnifying glass 65 is mounted in wall 61, which latter is reinforced by a member 62 in the same manner as wall 41 is reinforced by member 47, and lens 65 is held in place by an apertured piece of tape 69. The opening 57 in the rear lamina 56 is covered by a translucent, light-diffusing window 58, of suitable plastic composition material.

This embodiment of the optical viewer folds flat in the same manner as does that previously described. Upon pushing in of front wall 61, the side walls 64 fold inwardly and the top and bottom walls 63 fold outwardly, so that wall 61, or its reinforcement 62, lies substantially flush against the lamina 53. To erect the lens housing 60, it is merely necessary to pull out on wall 61. The film is then placed between the front and rear laminae 53 and 56 moved into alignment with lens 65. It will be noted, that in this case the slot receiving the film is laterally elongated so that the film may be readily shifted laterally for scanning, as distinguished from the first embodiment of the invention in which the lens housing may be shifted laterally of the film with the film remaining stationary.

In both embodiments of the invention, the design of the lens (45, 65) is such that, when the lens housing is substantially erected, a person having normal eyesight, and viewing a microfilm through the lens, will see the microfilm in proper focus. To properly focus the microfilm for viewing by persons having other than normal eyesight, the lens housing may be partially collapsed or, alternatively, the lens can be held slightly spaced from the eye.

While specific embodiments of the invention have been shown and described in detail to illustrate the application of the invention principles, it will be understood that the invention may be embodied otherwise without departing from such principles.

What is claimed is:

1. An optical viewer for microfilm comprising, in combination, a film holder including a pair of sheets of substantially opaque material arranged in superposition and secured together along a pair of opposite edges to define a film receiving slot between such opposite edges, said sheets having aligned window openings therein alignable with the film; a sheet of translucent light diffusing material covering the window opening in one of said opaque sheets; and a lens housing mounted on the other of said opaque sheets, and formed from a pre-cut blank of relatively flexible and substantially opaque material folded about fold lines to form a normally collapsed but readily erectable enclosure including a front wall having an aperture with a relatively high powered lens mounted therein, two pairs of opposed side walls foldable about medial fold lines, and a rear wall having a window opening aligned with the window opening in said other opaque sheet; said rear wall including flaps projecting from a pair of opposite side walls and engageable with said other opaque sheet for mounting of said lens housing on said film holder; said lens housing being normally collapsed with said front wall substantially flush with the outer surface of said other opaque sheet; said lens housing being erectable to form a substantially light proof tube through which a microfilm mounted in said slot may be viewed by holding the viewer so that light will enter through said sheet of light diffusing material, with the lens spaced from the microfilm to magnify selected areas of the latter; the lateral spacing of the opposite edges of the film receiving slot being substantially in excess of the corresponding lateral dimension of the window opening in the rear wall of said lens housing to provide for scanning of selected areas of the film by relative lateral movement of the film and said lens housing.

2. An optical viewer as claimed in claim 1 in which said lens housing is mounted on said other opaque sheet for sliding movement relative to the window opening in the latter to scan the film, said last named window opening being larger than the window opening in said lens housing.

3. An optical viewer as claimed in claim 1 in which said lens housing is fixedly mounted on said other opaque sheet, and the lateral dimension of said slot is substantially in excess of the lateral dimension of a microfilm to be viewed therein whereby a microfilm may be moved in such slot relative to said lens housing for scanning of different portions of the film.

4. An optical viewer for microfilm comprising, in combination, a film holder including a pair of substantially rectangular sheets of substantially opaque material arranged in superposition and secured together along a pair of opposite edges to define a film receiving slot between such opposite edges; said sheets having aligned and substantially congruent rectangular window openings therein alignable with the film; a sheet of translucent light diffusing material covering the window opening in one of said opaque sheets; and a lens housing mounted on the other of said opaque sheets and formed from a pre-cut blank of relatively flexible and substantially opaque material folded about fold lines to form a normally collapsed but readily erectable enclosure including a front wall having an aperture with a relatively high powered lens mounted therein, two pairs of opposed side walls foldable about medial fold lines, and a rear wall having a substantially rectangular window opening aligned with the window opening in said other opaque sheet; said rear wall including flaps projecting from a pair of opposite side walls and engageable with said other opaque sheet for mounting of said lens housing on said film holder; said lens housing being normally collapsed with said front wall being substantially flush with the outer surface of said other opaque sheet; said lens housing being erectable by pulling outwardly on the front wall thereof to erect the side walls to form a substantially light proof lens housing for viewing of a film in said slot by means of light diffused through said sheet of translucent material with the lens spaced from the film to magnify selected areas of the latter; the lateral spacing of the opposite edges of the film receiving slot being substantially in excess of the corresponding lateral dimension of the window opening in the rear wall of said lens housing to provide for scanning of selected areas of the film by relative lateral movement of the film and said lens housing.

5. An optical viewer as claimed in claim 4 including a first sheet of transparent flexible material covering and secured to the inner face of said other opaque sheet along such opposite edges thereof; a pair of separator strips secured to said first sheet of transparent material on the inner surface thereof and along such opposite edges; a second sheet of transparent flexible material covering and substantially congruent with said one of said opaque sheets and secured to the inner surface thereof and to said separator strips; the rear wall of the lens housing having a width substantially equal to the narrowest dimension of the window in said other opaque sheet, and a length less than the longer dimension of said window; said flaps constituting lateral extensions of said rear wall beyond such opposed side walls entering between said other opaque sheet and said first transparent sheet to guide said housing for movement longitudinally of the window in said other opaque sheet.

6. An optical viewer as claimed in claim 4 in which the inner edges of said opposed side walls have said flaps extending inwardly therefrom and defining said rear wall and the window opening therein; said flaps being secured to the outer surface of said other opaque sheet with their free edges aligned with the edges of the window opening therein.

7. An optical viewer as claimed in claim 5 in which the longitudinal dimension of the outer wall of said lens housing plus the width of one of said opposed side walls does not exceed the longitudinal dimension of the rectangular window in said other opaque sheet; whereby, when the lens housing is collapsed with the longitudinally opposed side walls folded outwardly, said lens housing will be substantially within the confines of the window opening in said other opague sheet.

8. An optical viewer for microfilm comprising, in combination, a substantially flat film holder formed with a film receiving slot extending transversely thereof between its opposite surfaces, said surfaces having aligned window openings therein alignable with the film; a sheet of translucent light diffusing material covering the window opening in one of said surfaces; and a lens housing mounted on the other of said surfaces, and formed from a pre-cut blank of relatively flexible and substantially opaque material folded about fold lines to form a normally collapsed but readily erectable enclosure including a front wall having an aperture with a relatively high powered lens mounted therein, two pairs of opposed side walls foldable about medial fold lines, and a rear wall having a window opening aligned with the window opening in said other surface; said rear wall including flaps projecting from a pair of opposite side walls and engageable with said other opaque sheet for mounting of said lens housing on said film holder; said lens housing being normally collapsed with said front wall substantially flush with said other surface; said lens housing being erectable to form a substantially light proof tube through which a microfilm mounted in said slot may be viewed by holding the viewer so that light will enter through said sheet of light diffusing material, with the lens spaced from the microfilm to magnify selected areas of the latter; the lateral spacing of the opposite edges of the film receiving slot being substantially in excess of the corresponding lateral dimension of the window opening in the rear wall of said lens housing to provide for scanning of selected areas of the film by relative lateral movement of the film and said lens housing.

References Cited in the file of this patent

UNITED STATES PATENTS

| | | |
|---|---|---|
| 2,350,189 | Pratt | May 30, 1944 |
| 2,403,747 | O'Gorman | July 9, 1946 |
| 2,410,722 | Eckert | Nov. 5, 1946 |
| 2,715,853 | Austin | Aug. 23, 1955 |
| 2,789,460 | Kaufman | Apr. 23, 1957 |
| 2,859,548 | Pruner | Nov. 11, 1958 |